US012387590B2

(12) United States Patent
Kawamura et al.

(10) Patent No.: US 12,387,590 B2
(45) Date of Patent: Aug. 12, 2025

(54) VEHICLE INTERIOR MONITORING APPARATUS, VEHICLE INTERIOR MONITORING METHOD, AND NON-TRANSITORY COMPUTER-READABLE MEDIUM

(71) Applicant: NEC Corporation, Tokyo (JP)

(72) Inventors: Toshiaki Kawamura, Tokyo (JP); Yoshihiro Watanabe, Tokyo (JP); Yuichi Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/565,593

(22) PCT Filed: Jun. 4, 2021

(86) PCT No.: PCT/JP2021/021327
§ 371 (c)(1),
(2) Date: Nov. 30, 2023

(87) PCT Pub. No.: WO2022/254683
PCT Pub. Date: Dec. 8, 2022

(65) Prior Publication Data
US 2024/0257628 A1    Aug. 1, 2024

(51) Int. Cl.
*G08B 21/02* (2006.01)
*G06V 20/59* (2022.01)
(Continued)

(52) U.S. Cl.
CPC ............. *G08B 21/22* (2013.01); *G06V 20/59* (2022.01); *G06V 40/178* (2022.01); *G08B 21/182* (2013.01); *G08B 21/24* (2013.01)

(58) Field of Classification Search
USPC ........ 340/573.1, 427–429, 426.12, 435, 488, 340/539.22, 568.1, 555, 571, 691.6, 5.32,
(Continued)

(56) References Cited

U.S. PATENT DOCUMENTS

| 9,845,050 B1 * | 12/2017 | Garza ................ G08B 21/0205 |
| 10,783,386 B1 * | 9/2020 | Li ........................... G08B 21/22 |
| 2011/0080288 A1 * | 4/2011 | Younse .................. B60N 2/267 |
| | | 340/573.1 |

(Continued)

FOREIGN PATENT DOCUMENTS

| CN | 111409550 A | 7/2020 |
| CN | 112507976 A | 3/2021 |

(Continued)

OTHER PUBLICATIONS

International Search Report for PCT Application No. PCT/JP2021/021327, mailed on Aug. 17, 2021.

(Continued)

*Primary Examiner* — Daniel Previl

(57) ABSTRACT

A vehicle interior monitoring apparatus (10) includes an acquisition unit (110), a detection unit (120), and a notification processing unit (130). The acquisition unit (110) repeatedly acquires, after a power source of a vehicle is turned off and a door of the vehicle is opened and closed at least once, sensor data indicating a result of detection by a sensor of which a detection range is an interior of the vehicle. The detection unit (120) performs, by using the sensor data, detection processing of a living body existing in the interior, each time the acquisition unit (110) acquires the sensor data. The notification processing unit (130) performs monitoring on an environment of the interior when a living body existing in the interior is detected, and performs notification for a pre-registered terminal (40) when the environment meets a first criterion.

20 Claims, 7 Drawing Sheets

(51) Int. Cl.
  *G06V 40/16*  (2022.01)
  *G08B 21/18*  (2006.01)
  *G08B 21/22*  (2006.01)
  *G08B 21/24*  (2006.01)

(58) Field of Classification Search
  USPC ........................................................ 340/5.83
  See application file for complete search history.

(56) References Cited

U.S. PATENT DOCUMENTS

2020/0071967 A1* 3/2020 Adams ............... G07C 9/00174
2020/0372782 A1* 11/2020 Yu .......................... G08B 21/22
2022/0222949 A1    7/2022 Lv et al.

FOREIGN PATENT DOCUMENTS

| JP | 2002-063668 A | 2/2002 |
| JP | 2020-128124 A | 8/2020 |
| JP | 2020-201108 A | 12/2020 |
| WO | 2013/155661 A1 | 10/2013 |
| WO | 2020/065811 A1 | 4/2020 |

OTHER PUBLICATIONS

Extended European Search Report for EP Application No. 21944179.7, dated on Jun. 14, 2024.

* cited by examiner

VEHICLE INTERIOR MONITORING APPARATUS, VEHICLE INTERIOR MONITORING METHOD, AND NON-TRANSITORY COMPUTER-READABLE MEDIUM

This application is a National Stage Entry of PCT/JP2021/021327 filed on Jun. 4, 2021, the contents of all of which are incorporated herein by reference, in their entirety.

TECHNICAL FIELD

The present invention relates to a vehicle interior monitoring apparatus, a vehicle interior monitoring method, and a program.

BACKGROUND ART

An environment (for example, temperature) inside a stopped vehicle tends to be harsh for a living body such as a person, a pet, and the like. Therefore, it is necessary to monitor an environment inside a vehicle when a living body remains inside the vehicle after the vehicle is stopped. For example, Patent Document 1 describes the following human detection apparatus. First, after a vehicle is stopped, the human detection apparatus estimates, by using a change rate of temperature inside the vehicle, a time in which it takes for the temperature inside the vehicle to reach a critical temperature. Then, the human detection apparatus outputs a human detection notice to an outside of the vehicle when a person is detected before reaching the time. In Patent Document 1, a mass sensor, a CCD camera, and a pyroelectric infrared sensor are exemplified as a human sensor.

RELATED DOCUMENT

Patent Document

Patent Document 1: Japanese Patent Application Publication No. 2002-63668

SUMMARY OF INVENTION

Technical Problem

Since a living body moves, the living body may be in a state in which the living body is undetected by a sensor even though the living body stays inside a vehicle after being detected by the sensor. One example of an object of the present invention is to output predetermined information to an outside of the vehicle when an environment inside the vehicle meets a criterion, even when the living body in the vehicle is in such a state.

Solution to Problem

According to one aspect of the present invention, a vehicle interior monitoring apparatus is provided, including:
  an acquisition unit that repeatedly acquires, after a power source of a vehicle is turned off and a door of the vehicle is opened and closed at least once, sensor data indicating a result of detection by a sensor of which a detection range is an interior of the vehicle;
  a detection unit that performs, by using the sensor data, detection processing of a living body existing in the interior, each time the acquisition unit acquires the sensor data; and
  a notification processing unit that performs monitoring on an environment of the interior when a living body existing in the interior is detected, and performs predetermined notification for a pre-registered terminal when the environment meets a first criterion.

According to one aspect of the present invention, a vehicle interior monitoring method executed by a computer is provided. The vehicle interior monitoring method includes:
  acquisition processing of repeatedly acquiring, after a power source of a vehicle is turned off and a door of the vehicle is opened and closed at least once, sensor data indicating a result of detection by a sensor of which a detection range is an interior of the vehicle;
  detection processing of performing, by using the sensor data, detection processing of a living body existing in the interior, each time the sensor data are acquired; and
  notification processing of performing monitoring on an environment of the interior when a living body existing in the interior is detected, and performing predetermined notification for a pre-registered terminal when the environment meets a first criterion.

According to one aspect of the present invention, a program is provided, causing functions to be included, the functions are:
  an acquisition function of repeatedly acquiring, after a power source of a vehicle is turned off and a door of the vehicle is opened and closed at least once, sensor data indicating a result of detection by a sensor of which a detection range is an interior of the vehicle;
  a detection function of performing, by using the sensor data, detection processing of a living body existing in the interior, each time the acquisition function acquires the sensor data; and
  a notification processing function of performs monitoring on an environment of the interior when a living body existing in the interior is detected, and performing predetermined notification for a pre-registered terminal when the environment meets a first criterion.

Advantageous Effects of Invention

According to the present invention, even when a living body in a vehicle is in a state in which the living body is undetected by a sensor after being detected by the sensor, predetermined information is output to an outside of the vehicle when an environment in the vehicle meets a criterion.

BRIEF DESCRIPTION OF DRAWINGS

The above-described object, another object, a feature and an advantage will be further clarified by suitable example embodiments described below and the following drawings accompanying thereto.

DESCRIPTION OF EMBODIMENTS

In the following, example embodiments of the present invention will be described with reference to the drawings. Note that, in all the drawings, a similar component is denoted with a similar reference sign, and description thereof will not be repeated as appropriate.

First Example Embodiment

Figure 1:
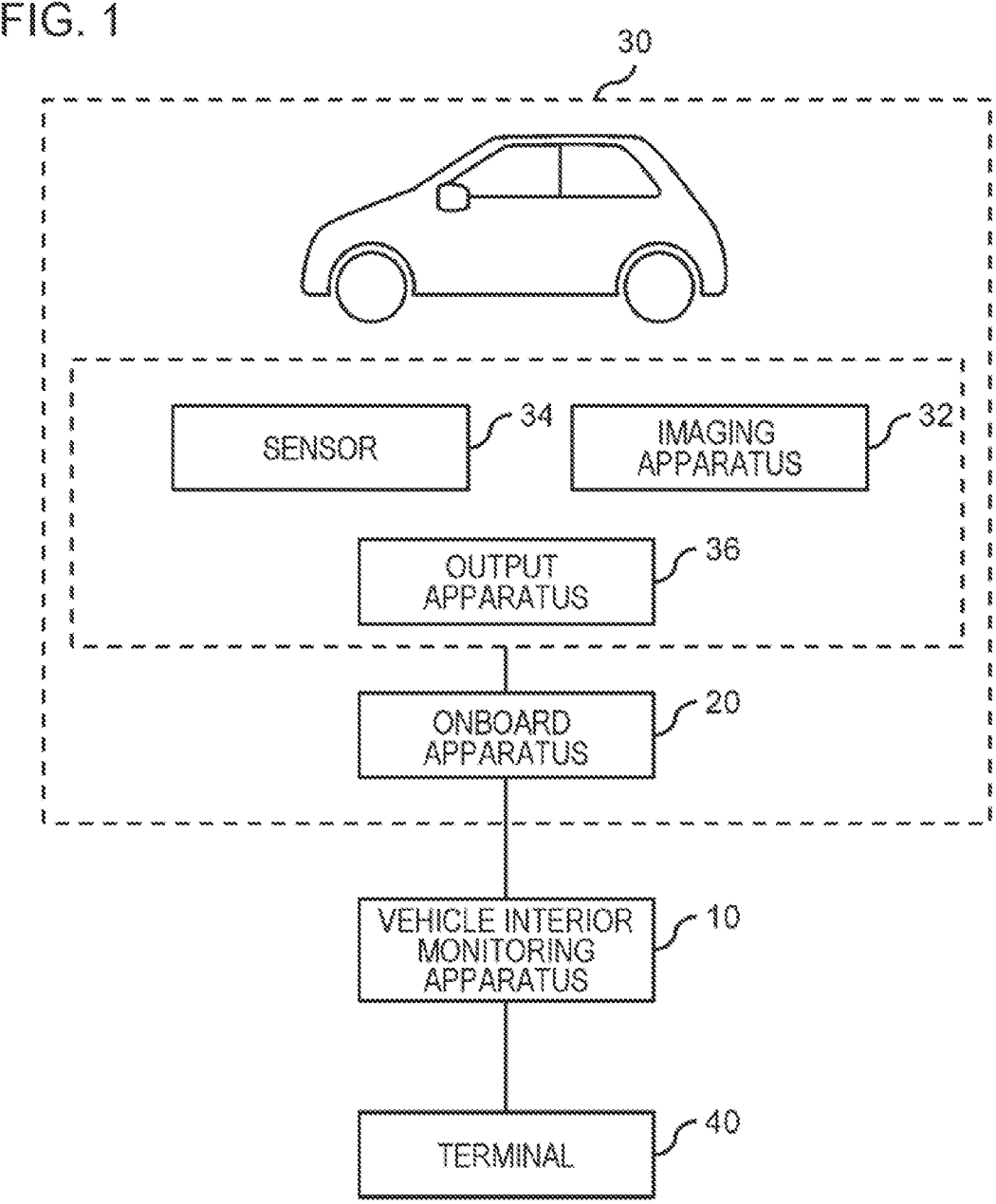
FIG. 1 It is a diagram for describing a usage environment of a vehicle interior monitoring apparatus according to a first example embodiment.

FIG. 1 is a diagram for describing a usage environment of a vehicle interior monitoring apparatus 10 according to the present example embodiment. The vehicle interior monitoring apparatus 10 is used along with an onboard apparatus 20. The vehicle interior monitoring apparatus 10 is, for example, a server installed outside a vehicle 30.

The onboard apparatus 20 repeatedly transmits, after the vehicle 30 is stopped and a door of the vehicle 30 is opened and then closed, data (hereinafter, referred to as sensor data) indicating a result of detection by a sensor of which a detection range is an interior of the vehicle 30 to the vehicle interior monitoring apparatus 10. An interval of transmitting the sensor data is, for example, equal to or more than one second and equal to or less than one minute, but is not limited to this range.

Each time acquiring sensor data from the onboard apparatus 20, the vehicle interior monitoring apparatus 10 determines, by processing the sensor data, whether a living body, for example, a person such as a child or an elderly person, or an animal such as a pet remains in the interior of the vehicle 30. Then, when a living body remains, the vehicle interior monitoring apparatus 10 transmits information (hereinafter, referred to as alarm information) indicating that the living body remains to a terminal 40 when an environment of the interior of the vehicle 30 meets a predetermined condition.

The terminal 40 is, for example, used by a user of the vehicle 30. More specifically, the terminal 40 may be a terminal used by a parent of a child, or may be a terminal used by a child of an elderly person. Further the terminal 40 may be managed by a predetermined organization. The predetermined organization may be, for example, a public institution such as police or an organization entrusted by the police, or a private agency such as a security company.

The vehicle 30 includes, as at least part of the sensor, an imaging apparatus 32. The imaging apparatus 32 generates an image of the interior of the vehicle 30. The onboard apparatus 20 transmits the image (hereinafter, referred to as an interior image) to the vehicle interior monitoring apparatus 10, as part of sensor data. Note that, the onboard apparatus 20 may transmit, along with the interior image or instead of the interior image, feature data indicating a feature value of the interior image. Hereinafter, the interior image and/or the feature data is referred to as image data. Note that, a plurality of the imaging apparatuses 32 may be installed in the vehicle 30. In this case, the plurality of imaging apparatuses 32 are installed at locations different from each another, and at least part of an imaging range differs from each other.

Further, the vehicle 30 further includes a sensor 34. The sensor 34 generates information (hereinafter, referred to as environmental information) indicating an environment of the interior of the vehicle 30. One example of the environment is temperature. Then, the onboard apparatus 20 transmits, as part of the sensor data, the information generated by the sensor 34 to the vehicle interior monitoring apparatus 10, in addition to an image generated by the imaging apparatus 32.

Further, the sensor 34 may include, for example, at least one of a millimetric wave sensor, an infrared sensor, a temperature sensor, and a vibration sensor. These sensors generate information (hereinafter, referred to as human detection data) indicating presence or absence of a living body existing in the interior of the vehicle 30. The onboard apparatus 20 also transmits the human detection data to the vehicle interior monitoring apparatus 10, as part of the sensor data.

Further, the vehicle 30 includes an output apparatus 36. The output apparatus 36 is, for example, a head lamp, a tail lamp, a brake lamp, a sound output apparatus (for example, a horn), and the like, and an output therefrom is recognizable for a person around the vehicle 30. The output apparatus 36 may be a display visible from outside of the vehicle 30. When transmitting alarm information to the terminal 40, the vehicle interior monitoring apparatus 10 causes, as appropriate, via the onboard apparatus 20, the output apparatus 36 to perform predetermined output. Note that, the output apparatus 36 may directly transmit alarm information to an external terminal (for example, the terminal 40). In this case, the output apparatus 36 uses, for example, at least one of a telephone, an email, and SNS.

Note that, the onboard apparatus 20 may communicate with the imaging apparatus 32, the sensor 34, and the output apparatus 36 directly, or communicate via a control apparatus installed in the vehicle 30. Alternatively, the onboard apparatus 20 may be integrated with the imaging apparatus 32.

Figure 2:
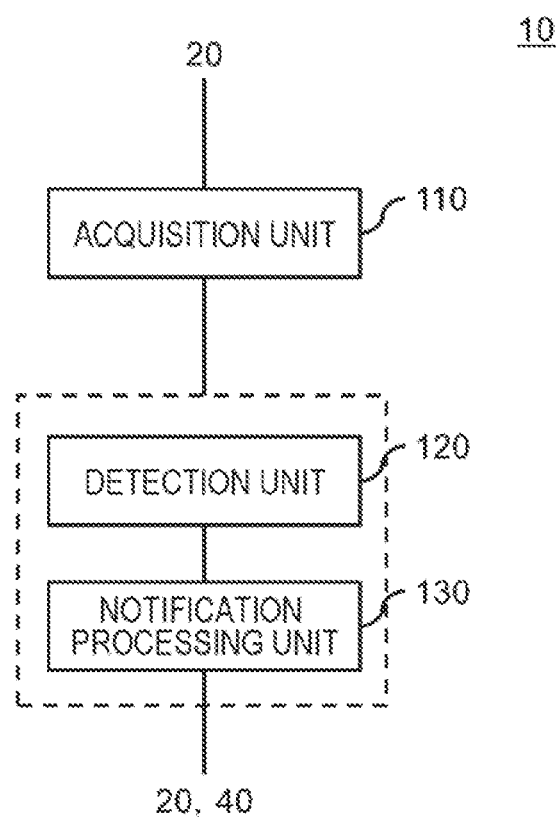
FIG. 2 It is a diagram illustrating one example of a functional configuration of the vehicle interior monitoring apparatus.

FIG. 2 is a diagram illustrating one example of a functional configuration of the vehicle interior monitoring apparatus 10. The vehicle interior monitoring apparatus 10 includes an acquisition unit 110, a detection unit 120, and a notification processing unit 130.

The acquisition unit 110 acquires sensor data from the onboard apparatus 20. As described above, the sensor data include at least image data and information generated by the sensor 34.

The detection unit 120 performs, by using the sensor data acquired by the acquisition unit 110, detection processing of a living body existing in the interior of the vehicle 30. For example, the detection unit 120 may perform the detection processing by using a model generated using machine learning, or may perform the detection processing by using a feature value of a living body (for example, a feature value of a person, a feature value of a dog, and a feature value of a cat).

The detection unit 120 may change a detection processing algorithm (or the model described above) for each type of living body. For example, when a living body is a person, the detection unit 120 may detect the living body by using an algorithm for face detection. In this case, the detection unit 120 may further estimate the age of the person.

Further, the detection unit 120 may perform the detection processing using image data and the detection processing using information generated by the sensor 34 separately. Then, the detection unit 120 may determine that a living body exists in the interior of the vehicle 30 when the living body is detected in either one of the detection, or may determine that a living body exists in the interior of the vehicle 30 when the living body is detected in both of the detection.

When a living body existing in the interior of the vehicle 30 is detected by the detection unit 120, the notification processing unit 130 performs monitoring on an environment of the interior. The monitoring is performed by using environmental information included in sensor data. Then, when the environment of the interior of the vehicle 30 meets a first criterion, the notification processing unit 130 performs predetermined notification for the terminal 40. The notification processing unit 130 preliminarily stores notification destination information (for example, an email address and SNS account information) for performing notification for the terminal 40.

Herein, the notification processing unit 130 may store notification destination information on a plurality of the terminals 40, along with their priority. In this case, the notification processing unit 130 performs notification for a terminal 40 that has a highest priority. Then, when no reply is received from the notified terminal 40 within a predetermined time, the notification processing unit 130 performs notification for the terminal 40 that has a second highest priority. The notification processing unit 130 repeats the processing until a reply is received from the notified terminal 40 within the predetermined time.

Figure 3:
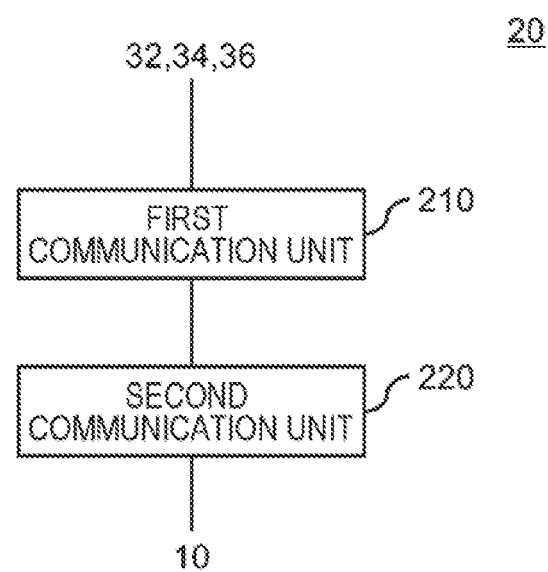
FIG. 3 It is a diagram illustrating one example of a functional configuration of an onboard apparatus.

FIG. 3 is a diagram illustrating one example of a functional configuration of the onboard apparatus 20. The onboard apparatus 20 includes a first communication unit 210 and a second communication unit 220.

The first communication unit 210 communicates with an apparatus inside the vehicle 30. For example, the first communication unit 210 acquires, from the imaging apparatus 32, an image generates by the imaging apparatus 32, and also acquires, from the sensor 34, data indicating a result of detection by the sensor 34. Further, the first communication unit 210 outputs a signal for causing the output apparatus 36 to perform the predetermined output. A destination of the signal may be the output apparatus 36, or may be a control apparatus of the output apparatus 36. Note that, the first communication unit 210, and the imaging apparatus 32 and the sensor 34 communicate with each other, for example, by using wireless, however, they may communicate with each other by using wire. Further, the first communication unit 210 and the output apparatus 36 (or the control apparatus of the output apparatus 36) communicate with each other, for example, by using wire, however, they may communicate with each other by using wireless.

Further, the first communication unit 210 acquires information indicating a state of the vehicle 30 from a control apparatus inside the vehicle 30. For example, the first communication unit 210 acquires information indicating whether a power source of the vehicle 30 is stopped (for example, information indicating whether an engine or a motor is turned on or turned off) and information indicating that a door of the vehicle 30 is opened and closed.

The second communication unit 220 communicates with the vehicle interior monitoring apparatus 10. For example, the second communication unit 220 transmits sensor data to the vehicle interior monitoring apparatus 10. Herein, the second communication unit 220 may generate feature data as necessary, by processing an image generated by the imaging apparatus 32. Further, the second communication unit 220 may generate at least one of environmental information and human detection data as necessary, by processing data generated by the sensor 34. Note that, these pieces of data may be the data itself generated by the sensor 34.

Further, the second communication unit 220 acquires, from the vehicle interior monitoring apparatus 10, information for causing the output apparatus 36 to perform the predetermined output. The information is output to the output apparatus 36 (or the control apparatus of the output apparatus 36) via the first communication unit 210.

Figure 4:
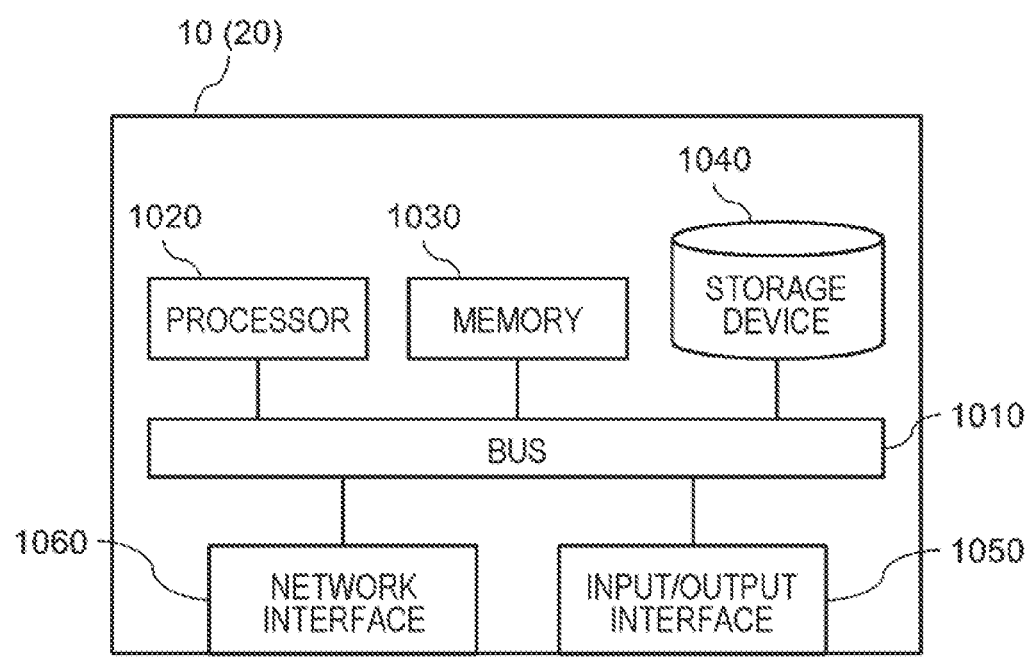
FIG. 4 It is a diagram illustrating a hardware configuration example of the vehicle interior monitoring apparatus.

FIG. 4 is a diagram illustrating a hardware configuration example of the vehicle interior monitoring apparatus 10. The vehicle interior monitoring apparatus 10 includes a bus 1010, a processor 1020, a memory 1030, a storage device 1040, an input/output interface 1050, and a network interface 1060.

The bus 1010 is a data transmission path for the processor 1020, the memory 1030, the storage device 1040, the input/output interface 1050, and the network interface 1060 to transmit and receive data to and from one another. However, a method of connecting the processor 1020 and the like with each other is not limited to bus connection.

The processor 1020 is a processor achieved with a central processing unit (CPU), a graphics processing unit (GPU), and the like.

The memory 1030 is a main storage apparatus achieved with a random access memory (RAM) and the like.

The storage device 1040 is an auxiliary storage apparatus achieved with a hard disk drive (HDD), a solid state drive (SSD), a memory card, a read only memory (ROM), or the like. The storage device 1040 stores a program module that achieves each function of the vehicle interior monitoring apparatus 10 (for example, the acquisition unit 110, the detection unit 120, and the notification processing unit 130). The processor 1020 reads each of the program modules onto the memory 1030 and executes the program module, and thereby each function related to the program module is achieved.

The input/output interface 1050 is an interface for connecting the vehicle interior monitoring apparatus 10 and various pieces of input/output equipment with each other.

The network interface 1060 is an interface for connecting the vehicle interior monitoring apparatus 10 to a network. The network is, for example, a local area network (LAN) or a wide area network (WAN). A method in which the network interface 1060 connects to the network may be wireless connection, or may be wired connection. The vehicle interior monitoring apparatus 10 communicates with the onboard apparatus 20 via the network interface 1060.

Figure 5:
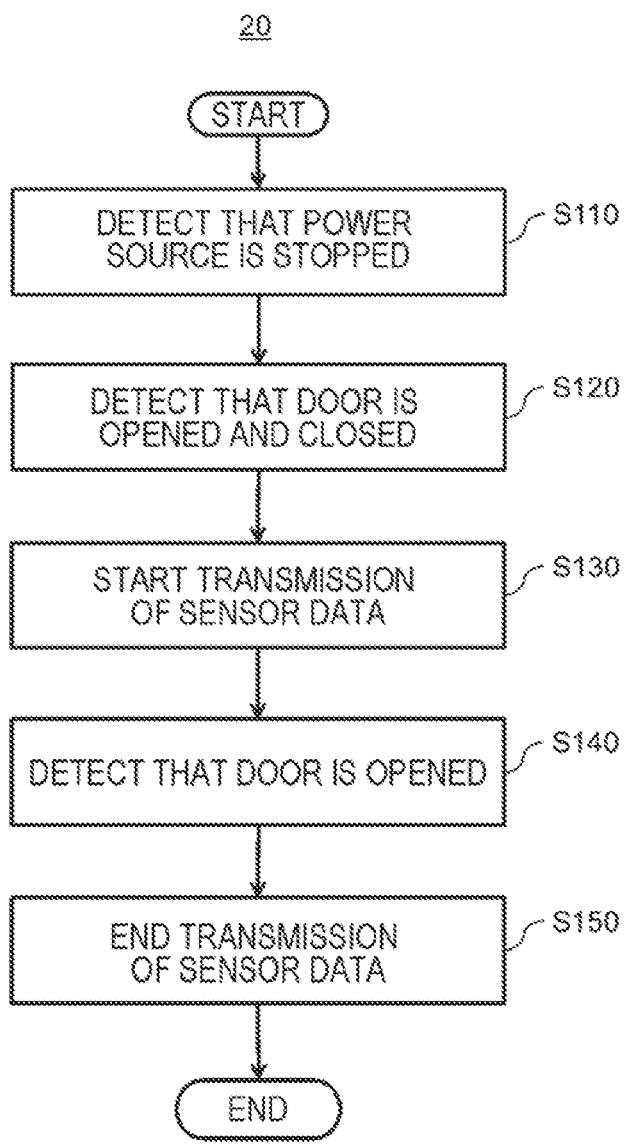
FIG. 5 It is a diagram illustrating one example of processing performed by the onboard apparatus.

Note that, a hardware configuration of the onboard apparatus 20 is similar to the example illustrated in FIG. 5. In this case, the storage device 1040 stores a program module that achieves the first communication unit 210 and the second communication unit 220.

FIG. 5 is a diagram illustrating one example of processing performed by the onboard apparatus 20. The first communication unit 210 repeatedly acquires, from the control apparatus inside the vehicle 30, information indicating a state of the vehicle 30. When the second communication unit 220 detects, by using the information acquired by the first communication unit 210, that the power source of the vehicle 30 is stopped, specifically, the vehicle 30 is stopped (step S110), the second communication unit 220 senses that a door of the vehicle 30 is opened then closed (step S120). Step S120 indicates that a main occupant (for example, a driver) of the vehicle 30 has left the vehicle 30. Then, the second communication unit 220 causes, via the first communication unit 210, the imaging apparatus 32 to start imaging and the sensor 34 to start operating. Then, the second communication unit 220 starts transmitting sensor data to the vehicle interior monitoring apparatus 10 (step S130).

Note that, as described above, the sensor data includes at least image data based on an image generated by the imaging apparatus 32. Further, when the sensor 34 includes at least one of a millimetric wave sensor, an infrared sensor, a temperature sensor, and a vibration sensor, the sensor data also includes information generated by these sensors. The sensor data further includes environmental information, specifically, information indicating an environment (for example, temperature) of the interior of the vehicle 30.

Further, at least one of "the door of the vehicle 30 is locked" and "a predetermined time has elapsed since the door is no longer opened or closed" may further be added to a condition for the processing to transition from step S120 to step S130.

Further, "after a predetermined time has elapsed since a person in a driver's seat is no longer detected" may be used as a condition for the processing to proceed from step S110 to step S130.

Then, until a door is opened again, specifically, until a person returns to the vehicle 30 (step S140), the onboard apparatus 20 continues transmitting sensor data (step S150). In other words, the onboard apparatus 20 continues transmitting sensor data from when a person leaves the vehicle 30 until when the person returns.

Note that, the onboard apparatus 20 may transmit only the environmental information to the vehicle interior monitoring apparatus 10 after the vehicle interior monitoring apparatus 10 detects a living body remaining in the interior of the vehicle 30. To do so, after detecting the living body, the vehicle interior monitoring apparatus 10 may transmit information indicating that the living body is detected to the onboard apparatus 20.

Figure 6:
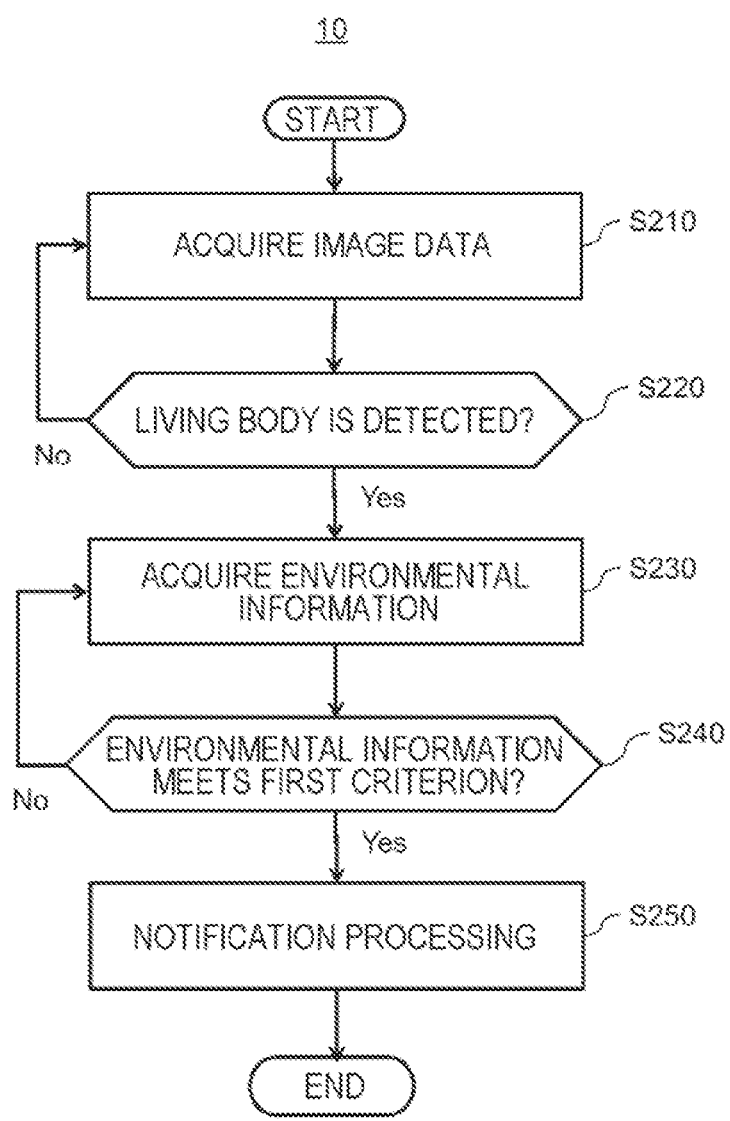
FIG. 6 It is a diagram illustrating one example of processing performed by the vehicle interior monitoring apparatus.

FIG. 6 is a diagram illustrating one example of processing performed by the vehicle interior monitoring apparatus 10. When the vehicle interior monitoring apparatus 10 starts receiving sensor data and environmental information from the onboard apparatus 20, the vehicle interior monitoring apparatus 10 performs the processing illustrated in the present drawing. As described above, the onboard apparatus 20 continues to transmit sensor data from when the a person leaves the vehicle 30 until the person returns. Thus, the vehicle interior monitoring apparatus 10 performs the processing illustrated in the present drawing from when a person leaves the vehicle 30 until the person returns.

First, the acquisition unit 110 acquires sensor data from the onboard apparatus 20. Then, the detection unit 120 acquires image data out of the sensor data (step S210), and determines, by processing the image data, presence or absence of a living body in the interior of the vehicle 30 (step S220). When no living body is detected from the piece of image data processed this time (step S220: No), the detection unit 120 performs similar processing for a piece of image data acquired next by the acquisition unit 110 (steps S210, S220).

Note that, in steps S210 and S220, human detection data generated by the sensor 34 may be used along with the image data.

On the other hand, when the detection unit 120 detects a living body (step S220: Yes), the notification processing unit 130 acquires environmental information transmitted along with the piece of image data from which the living body is sensed (step S230), and determines, by processing the environmental information, whether an environment of the interior meets a first criterion (step S240). The first criterion may be, for example, that temperature of the interior exceeds a first reference value (for example, a value equal to or more than 30° C. and equal to or less than 40° C.), or that the temperature of the interior falls below a second reference vale (for example, a value equal to or more than 0° C. and equal to or less than 10° C.) being set lower than the first reference value.

When the environment of the interior does not meet the first criterion (step S240: No), the notification processing unit 130 performs a similar processing for a piece of environmental information acquired next from the onboard apparatus 20 by the acquisition unit 110 (steps S230, S240). At this occasion, the detection unit 120 may stop the detection processing of a living body until a door of the vehicle 30 is opened again. A reason for this is, for example, that a living body may be out of the imaging range of the imaging apparatus 32, or that a living body may get under a blanket and the like. In this case, when the detection unit 120 continuously performs the detection processing of a living body, it may be incorrectly determined that a living body is not present in the interior, even though the living body is present in the interior.

On the other hand, when the environment of the interior meets the first criterion (step S240: Yes), the notification processing unit 130 transmits information indicating that the first criterion is met, specifically, alarm information, to the terminal 40 (step S250). After that, the notification processing unit 130 may repeatedly transmit the alarm information until a user of the terminal 40 confirms the alarm information (for example, until a predetermined reply is received from the terminal 40). Then, the vehicle interior monitoring apparatus 10 may end the processing when the predetermined reply is received from the terminal 40.

Herein, when the notification processing unit 130 stores information on a plurality of the terminals 40, the notification processing unit 130 performs notification for a terminal 40 that has a highest priority. Then, when no reply is received from the notified terminal 40 within a predetermined time, notification is performed for a terminal 40 that has a second highest priority. The notification processing unit 130 repeats the processing until a reply is received from the notified terminal 40 within a predetermined time.

Further, the notification processing unit 130 may perform the processing described as the step S250 when a state in which the first criterion is met continues for a predetermined time.

Further, when a living body is a person, the detection unit 120 may estimate age of the detected person in step S220. Then, the notification processing unit 130 may further add "the age meets a second criterion" to a condition for transmitting the alarm information. The second criterion is, for example, that the person is 10 years old or younger, the person is 70 years old or older, or that either one of these two conditions is met.

Further, in step S250, the notification processing unit 130 may further transmit, to the onboard apparatus 20, information for causing the output apparatus 36 to perform the predetermined output. In this case, the onboard apparatus 20 causes the output apparatus 36 to perform the predetermined output. In this way, a person around the vehicle 30 can recognize that a living body exists in the vehicle 30.

Further, the detection unit 120 may determine, by processing image data when the environment of the interior meets the first criterion, whether a living body is currently captured by the imaging apparatus 32. Then, the notification processing unit 130 may include a result of the determination in alarm information. In this way, a user of the terminal 40 can easily estimate where in the interior the living body is.

Note that, in the processing illustrated in the FIG. 5, the onboard apparatus 20 transmits sensor data to the vehicle interior monitoring apparatus 10 after the power source is turned off and a door is opened and closed at least once. However, the onboard apparatus 20 may constantly transmit sensor data to the vehicle interior monitoring apparatus 10. In this case, the onboard apparatus 20 transmits information indicating that the power source is turned on or turned off to the vehicle interior monitoring apparatus 10 at timing when the power source is turned on or turned off, and also transmits information indicating that a door is opened and closed to the vehicle interior monitoring apparatus 10 at timing when the door is opened and closed. The vehicle interior monitoring apparatus 10 selects, from the sensor data acquired from the onboard apparatus 20, data after the power source is turned off and a door is opened and closed at least once, by using these pieces of information, and performs the processing illustrated in FIG. 6.

As described above, according to the present example embodiment, the vehicle interior monitoring apparatus 10 first determines, by using sensor data, whether a living body is present in the interior of the vehicle 30. Then, when a living body is present in the interior of the vehicle 30, the vehicle interior monitoring apparatus 10 performs monitoring, by using environmental information, whether an environment of the interior of the vehicle 30 meets the first criterion. During the monitoring, the vehicle interior monitoring apparatus 10 does not use the sensor data. Specifically, once the vehicle interior monitoring apparatus 10 senses a living body, the vehicle interior monitoring apparatus 10 continues to monitor the environment in the interior, even when the living body is no longer sensed. Therefore, the vehicle interior monitoring apparatus 10 can transmit predetermined information to the terminal 40 when the environment in the vehicle meets the first criterion, even when a living body in the interior is in a state in which the living body is not easily detected by the imaging apparatus 32 and the sensor 34.

Further, the vehicle interior monitoring apparatus 10 acquires sensor data after the power source of the vehicle 30 is turned off and a door is opened and closed at least once, and processes the sensor data. Therefore, a communication traffic volume between the vehicle interior monitoring apparatus 10 and the onboard apparatus 20 is reduced, and an amount of computation by the vehicle interior monitoring apparatus 10 is also reduced. Further, the vehicle interior monitoring apparatus 10 stops the detection processing of a living body after detecting a living body. Therefore, the amount of computation by the vehicle interior monitoring apparatus 10 is further reduced.

Second Example Embodiment

Figure 7:
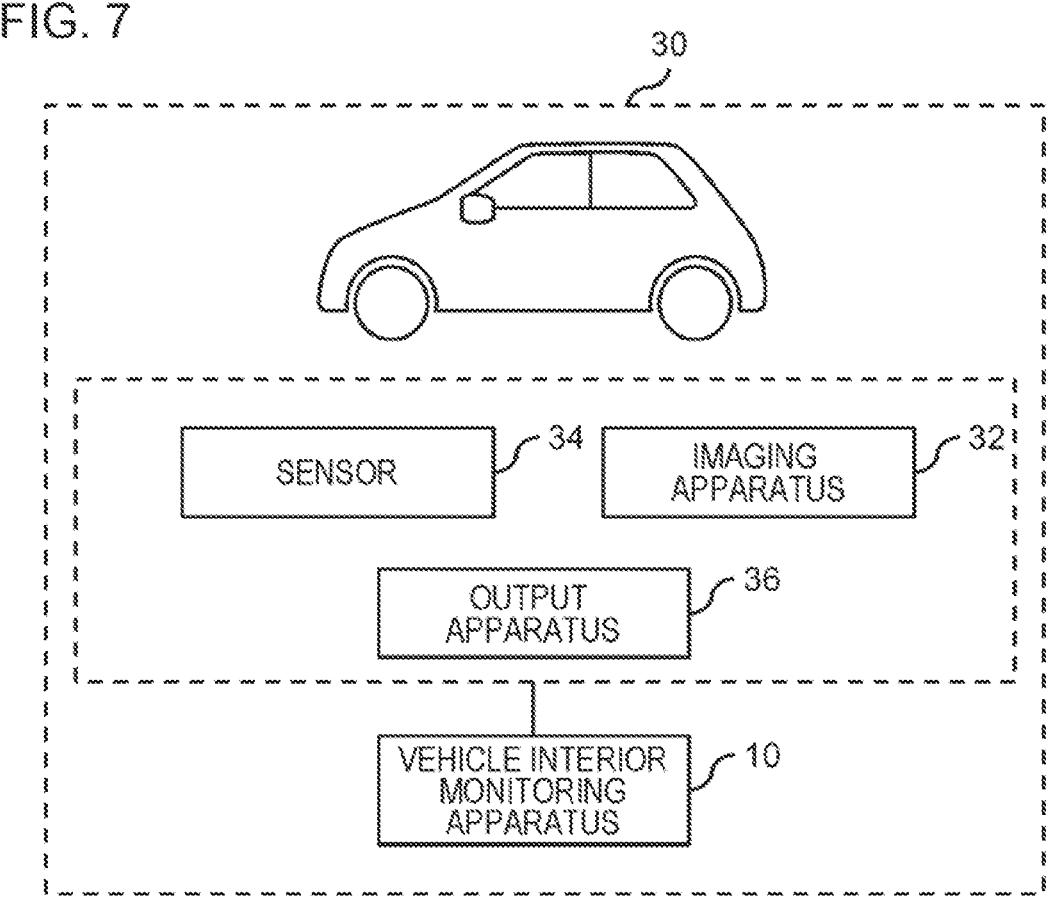
FIG. 7 It is a diagram for describing a usage environment of a vehicle interior monitoring apparatus according to a second example embodiment.

FIG. 7 is a diagram for describing a usage environment of a vehicle interior monitoring apparatus 10 according to the present example embodiment. In the example illustrated in the present drawing, the vehicle interior monitoring apparatus 10 is installed inside a vehicle 30. In other words, an onboard apparatus 20 illustrated in FIG. 1 includes a function of the vehicle interior monitoring apparatus 10. Also in this way, an advantageous effect similar to that of the first example embodiment can be achieved.

While the example embodiments of the present invention have been described with reference to the drawings, the example embodiments are examples of the present invention, and various configurations other than those described above may be adopted.

Further, although a plurality of steps (pieces of processing) are described in order in the plurality of flowcharts referred to in the above description, an order of executing the steps in each example embodiment is not limited to an order described in the flowcharts. In each example embodiment, an order of the illustrated steps may be changed to an extent that contents thereof are not interfered. Further, each of the above-described example embodiments can be combined to an extent that contents thereof do not conflict with each other.

A part or the entirety of the above-described example embodiments may be described as the following supplementary notes, but is not limited thereto.

1. A vehicle interior monitoring apparatus including:
   an acquisition unit that repeatedly acquires, after a power source of a vehicle is turned off and a door of the vehicle is opened and closed at least once, sensor data indicating a result of detection by a sensor of which a detection range is an interior of the vehicle;
   a detection unit that performs, by using the sensor data, detection processing of a living body existing in the interior, each time the acquisition unit acquires the sensor data; and
   a notification processing unit that performs monitoring on an environment of the interior when a living body existing in the interior is detected, and performs predetermined notification for a pre-registered terminal when the environment meets a first criterion.

2. The vehicle interior monitoring apparatus according to supplementary note 1, in which
   the sensor includes an imaging apparatus.

3. The vehicle interior monitoring apparatus according to supplementary note 2, in which
   the sensor further includes at least one of a millimetric wave sensor, an infrared sensor, a temperature sensor, and a vibration sensor.

4. The vehicle interior monitoring apparatus according to any one of supplementary notes 1 to 3, in which
   the detection unit stops the detection processing after a living body existing in the interior is detected until a door of the vehicle is opened.

5. The vehicle interior monitoring apparatus according to any one of supplementary notes 1 to 4, in which
   the environment includes temperature.

6. The vehicle interior monitoring apparatus according to any one of supplementary notes 1 to 5, in which,
   when the environment exceeds the first criterion, the notification processing unit further causes an output apparatus installed in the vehicle to perform predetermined output.

7. The vehicle interior monitoring apparatus according to any one of supplementary notes 1 to 6, in which
   the living body includes at least one of a person and an animal.

8. The vehicle interior monitoring apparatus according to supplementary note 7, in which
   the detection unit estimates age of a person when the living body is the person, and
   the notification processing unit performs the notification when the age meets a second criterion.

9. A vehicle interior monitoring method including,
   executing by a computer:
   acquisition processing of repeatedly acquiring, after a power source of a vehicle is turned off and a door of the vehicle is opened and closed at least once, sensor data indicating a result of detection by a sensor of which a detection range is an interior of the vehicle;

detection processing of performing, by using the sensor data, detection on a living body existing in the interior, each time the sensor data are acquired; and notification processing of performing monitoring on an environment of the interior when a living body existing in the interior is detected, and performing predetermined notification for a pre-registered terminal when the environment meets a first criterion.

10. the vehicle interior monitoring method according to supplementary note 9, in which
the sensor includes an imaging apparatus.

11. The vehicle interior monitoring method according to supplementary note 10, in which
the sensor further includes at least one of a millimetric wave sensor, an infrared sensor, a temperature sensor, and a vibration sensor.

12. The vehicle interior monitoring method according to any one of supplementary notes 9 to 11, further including
by the computer, stopping the detection processing after a living body existing in the interior is detected until a door of the vehicle is opened.

13. The vehicle interior monitoring method according to any one of supplementary notes 9 to 12, in which
the environment includes temperature.

14. The vehicle interior monitoring method according to any one of supplementary notes 9 to 13, further including
by the computer, in the notification processing, further causing an output apparatus installed in the vehicle to perform predetermined output when the environment exceeds the first criterion.

15. The vehicle interior monitoring method according to any one of supplementary notes 9 to 14, in which
the living body includes at least one of a person and an animal.

16. The vehicle interior monitoring method according to supplementary note 15, further including,
by the computer:
in the detection processing, estimating age of a person when the living body is the person; and
in the notification processing, performing the notification when the age meets a second criterion.

17. A program causing a computer to include:
an acquisition function of repeatedly acquiring, after a power source of a vehicle is turned off and a door of the vehicle is opened and closed at least once, sensor data indicating a result of detection by a sensor of which a detection range is an interior of the vehicle;
a detection function of performing, by using the sensor data, detection processing of a living body existing in the interior, each time the acquisition function acquires the sensor data; and
a notification processing function of performing monitoring on an environment of the interior when a living body exiting in the interior is detected, and performs predetermined notification for a pre-registered terminal when the environment meets a for a first criterion.

18. The program according to supplementary note 17, in which
the sensor includes an imaging apparatus.

19. The program according to supplementary note 18, in which
the sensor further includes at least one of a millimetric wave sensor, an infrared sensor, a temperature sensor, and a vibration sensor.

20. The program according to any one of supplementary notes 17 to 19, in which
the detection function stops the detection processing after a living body existing in the interior is detected until a door of the vehicle is opened.

21. The program according to any one of supplementary notes 17 to 20, in which
the environment includes temperature.

22. The program according to any one of supplementary notes 17 to 21, in which,
when the environment exceeds the first criterion, the notification processing function further causes an output apparatus installed in the vehicle to perform predetermined output.

23. The program according to any one of supplementary notes 17 to 22, in which
the living body includes at least one of a person and an animal.

24. The program according to supplementary note 23, in which
the detection function estimates age of a person when the living body is the person, and
the notification processing function performs the notification when the age meets a second criterion.

REFERENCE SIGNS LIST

10 Vehicle interior monitoring apparatus
20 Onboard apparatus
30 Vehicle
32 Imaging apparatus
34 Sensor
36 Output apparatus
40 Terminal
110 Acquisition unit
120 Detection unit
130 Notification processing unit
210 First communication unit
220 Second communication unit

What is claimed is:
1. A vehicle interior monitoring apparatus comprising:
at least one memory storing instructions; and
at least one processor configured to execute the instructions to perform operations comprising:
acquiring, in a case where a power source of a vehicle is turned off and a door of the vehicle is opened and closed at least once, sensor data generated by a sensor monitoring an interior of the vehicle;
performing, by using the sensor data, detection processing of a living body existing in the interior, each time the sensor data is acquired;
notifying a terminal based on a result of the detection processing; and
stopping, in a case where the living body is detected, the detection processing until the door is opened again.

2. The vehicle interior monitoring apparatus according to claim 1, wherein
the sensor includes an imaging apparatus.

3. The vehicle interior monitoring apparatus according to claim 2, wherein
the sensor further includes at least one of a millimetric wave sensor, an infrared sensor, a temperature sensor, and a vibration sensor.

4. The vehicle interior monitoring apparatus according to claim 1, wherein
the operations further comprise:
performing, by using the sensor data, monitoring an environment of the interior; and
notifying the terminal in a case where the environment after the living body is detected meets a first criterion.

5. The vehicle interior monitoring apparatus according to claim 4, wherein
the environment includes temperature.

6. The vehicle interior monitoring apparatus according to claim 4, wherein
the operations further comprise:
performing the notification in a case where the environment exceeds the first criterion.

7. The vehicle interior monitoring apparatus according to claim 1, wherein the operations further comprise:
causing an output apparatus installed in the vehicle to perform output based on the result of the detection processing.

8. The vehicle interior monitoring apparatus according to claim 1, wherein
the living body includes at least one of a person and an animal.

9. The vehicle interior monitoring apparatus according to claim 8, wherein the operations further comprise
estimating an age of a person in a case where the living body is the person, and
performing the notification in a case where the age meets a second criterion.

10. The vehicle interior monitoring apparatus according to claim 1, wherein
the operations further comprise:
acquiring the sensor data in a case where a power source of a vehicle is turned off and a door of the vehicle is opened and closed at least once, and the door is locked.

11. The vehicle interior monitoring apparatus according to claim 1, wherein
the operations further comprise:
notifying a first terminal;
receiving a reply from the first terminal; and
notifying a second terminal in a case where no reply is received from the first terminal within a predetermined time.

12. A vehicle interior monitoring method executed performed by a computer and comprising:
acquiring, in a case where a power source of a vehicle is turned off and a door of the vehicle is opened and closed at least once, sensor data generated by a sensor monitoring an interior of the vehicle;
performing, by using the sensor data, detection of a living body existing in the interior, each time the sensor data is acquired;
notifying a terminal based on a result of the detection processing; and
stopping, in a case where the living body is detected, the detection processing until the door is opened again.

13. The vehicle interior monitoring method according to claim 12, wherein
the sensor includes an imaging apparatus.

14. The vehicle interior monitoring method according to claim 13, wherein
the sensor further includes at least one of a millimetric wave sensor, an infrared sensor, a temperature sensor, and a vibration sensor.

15. The vehicle interior monitoring method according to claim 12, further comprising:
performing, by using the sensor data, monitoring an environment of the interior; and
notifying the terminal in a case where the environment after the living body is detected meets a first criterion.

16. The vehicle interior monitoring method according to claim 15, wherein
the environment includes temperature.

17. A non-transitory computer-readable medium storing a program executable by a computer to perform operations comprising:
acquiring, in a case where a power source of a vehicle is turned off and a door of the vehicle is opened and closed at least once, sensor data generated by a sensor monitoring an interior of the vehicle;
performing, by using the sensor data, detection processing of a living body existing in the interior, each time the sensor data is acquired;
notifying a terminal based on a result of the detection processing; and
stopping, in a case where the living body is detected, the detection processing until the door is opened again.

18. The non-transitory computer-readable medium according to claim 17, wherein
the sensor includes an imaging apparatus.

19. The non-transitory computer-readable medium according to claim 18, wherein
the sensor further includes at least one of a millimetric wave sensor, an infrared sensor, a temperature sensor, and a vibration sensor.

20. The non-transitory computer-readable medium according to claim 17, wherein
the operations further comprise:
performing, by using the sensor data, monitoring an environment of the interior; and
notifying the terminal in a case where the environment after the living body is detected meets a first criterion.

* * * * *